United States Patent
Hock

(10) Patent No.: US 6,189,924 B1
(45) Date of Patent: Feb. 20, 2001

(54) PLURAL STAGE INFLATOR

(75) Inventor: Christopher Hock, Uintah, UT (US)

(73) Assignee: Autoliv ASP, Inc., Ogden, UT (US)

( * ) Notice: Under 35 U.S.C. 154(b), the term of this patent shall be extended for 0 days.

(21) Appl. No.: 08/976,174

(22) Filed: Nov. 21, 1997

(51) Int. Cl.$^7$ .................................................. B60R 21/26
(52) U.S. Cl. ............................................ 280/736; 280/741
(58) Field of Search ................................... 280/736, 737, 280/741, 742

(56) References Cited

U.S. PATENT DOCUMENTS

| | | |
|---|---|---|
| 3,773,353 | * 11/1973 | Trowbridge et al. ................. 280/737 |
| 3,877,882 | 4/1975 | Lette . |
| 3,972,545 | * 8/1976 | Kirchoff et al. ...................... 280/735 |
| 4,278,638 | 7/1981 | Nilsson et al. . |
| 5,048,862 | 9/1991 | Bender et al. . |
| 5,149,129 | 9/1992 | Unterforsthuber et al. . |
| 5,221,109 | 6/1993 | Marchant . |
| 5,273,722 | 12/1993 | Högenauer et al. . |
| 5,346,254 | 9/1994 | Esterberg . |
| 5,368,329 | 11/1994 | Hock . |
| 5,398,966 | 3/1995 | Hock . |
| 5,431,103 | 7/1995 | Hock et al. . |
| 5,443,284 | 8/1995 | Strahl et al. . |
| 5,470,104 | 11/1995 | Smith et al. . |
| 5,494,312 | 2/1996 | Rink . |
| 5,501,484 | 3/1996 | Saderholm et al. . |
| 5,505,488 | 4/1996 | Allard . |
| 5,513,879 | 5/1996 | Patel et al. . |
| 5,525,306 | 6/1996 | Schumucker et al. . |
| 5,531,473 | 7/1996 | Rink et al. . |
| 5,564,743 | 10/1996 | Marchant . |
| 5,608,183 | 3/1997 | Barnes et al. . |

* cited by examiner

*Primary Examiner*—Paul N. Dickson
*Assistant Examiner*—Faye M. Fleming
(74) *Attorney, Agent, or Firm*—Sally J. Brown

(57) ABSTRACT

An inflatable restraint inflator, system and method of operation which involve a plural stage inflator having a dual output squib to selectively ignite at least one of a discrete quantity of a first and second gas generant.

20 Claims, 2 Drawing Sheets

PLURAL STAGE INFLATOR

BACKGROUND OF THE INVENTION

This invention relates generally to inflators for use in inflating inflatable restraint airbag cushions, such as used to provide impact protection to occupants of motor vehicles. More particularly, the invention relates to plural stage inflators such as may provide an inflation gas output which is adaptive to factors such as one or more crash and occupant conditions.

It is well known to protect a vehicle occupant using a cushion or bag, e.g., an "airbag," that is inflated or expanded with gas when the vehicle encounters sudden deceleration, such as in a collision. In such systems, the airbag cushion is normally housed in an uninflated and folded condition to minimize space requirements. Upon actuation of the system, the cushion begins being inflated in a matter of no more than a few milliseconds with gas produced or supplied by a device commonly referred to as "an inflator."

Various types of inflator devices have been disclosed in the art for the inflation of an airbag such as used in inflatable restraint systems. One type of known inflator device derives inflation gas from a combustible pyrotechnic gas generating material which, upon ignition, generates a quantity of gas sufficient to inflate the airbag.

A second type of known inflator device forms airbag inflation gas from a combination of stored compressed gas and the combustion of a solid form of a pyrotechnic gas generating material. This type of inflator device is commonly referred to as a hybrid inflator.

A new type an inflator, called a "fluid fueled inflator," has been developed. Such inflators are the subject of commonly assigned Smith et al., U.S. Pat. No. 5,470,104, issued Nov. 28, 1995; Rink, U.S. Pat. No. 5,494,312, issued Feb. 27, 1996; and Rink et al., U.S. Pat. No. 5,531,473, issued Jul. 2, 1996, the disclosures of which are fully incorporated herein by reference.

Such inflator devices utilize a fuel material in the form of a fluid, e.g., in the form of a gas, liquid, finely divided solid, or one or more combinations thereof, in the formation of an inflation gas for an airbag. In one such inflator device, the fluid fuel material is burned to produce gas which contacts a quantity of stored pressurized gas to produce inflation gas for use in inflating a respective inflatable device.

In view of possibly varying operating conditions and, in turn, possibly varying desired performance characteristics, there is a need and a desire to provide what has been termed an "adaptive" inflator device and corresponding inflatable restraint system. With an adaptive inflator device, output parameters such as the quantity, supply, and rate of supply of inflation gas, for example, can be selectively and appropriately varied dependent on selected operating conditions such as ambient temperature, occupant presence, seat belt usage and rate of deceleration of the motor vehicle, for example.

While such adaptive systems are desirable, they typically require the inclusion of additional components as a part of the associated inflator device, thus increasing the size of the inflator. As such it has been even more difficult to provide an adaptive inflator which will meet the size requirements for vehicles, especially for driver side applications.

Thus, there remains a need for an adaptive inflator device of simple design and construction will meet the size requirements for vehicles, especially for driver side applications.

SUMMARY OF THE INVENTION

A general object of the invention is to provide an improved inflator, inflatable restraint system and associated or corresponding methods of operation.

A more specific objective of the invention is to overcome one or more of the problems described above.

The general object of the invention can be attained, at least in part, through a plural stage inflator for use in inflating an inflatable restraint airbag cushion. The inflator includes a housing which defines a first chamber which contains a first gas generant material and a second chamber which contains a second gas generant material. The inflator also includes an igniter device which includes a dual output squib with first and second igniter chambers containing respective first and second igniter charges. Upon activation, the dual output squib selectively ignites at least one of the first and second igniter charges, with the dual output squib having:

a) a first stage discharge whereby the first igniter charge is ignited to produce combustion products which in turn pass to the first chamber to ignite the first gas generant material to produce inflation gas at a first output level and b) a second stage discharge whereby the second igniter charge is ignited to produce combustion products which in turn pass to the second chamber to ignite the second gas generant material to produce inflation gas at a second output level.

The prior art fails to provide a plural stage inflator design as simple as desired. More particularly, the prior art fails to provide a plural stage inflator and associated inflatable restraint system, particularly an inflator for a driver side inflatable restraint system installation, wherein the inflator incorporates a single component, dual output squib and the system includes an inflator external inflation media filter material, particularly to the exclusion of an inflator internal filter.

In accordance with an alternative embodiment, the invention comprehends a plural stage inflator which includes a housing having a top wall, a bottom wall, and a generally cylindrical sidewall defining an upper annular chamber containing a first gas generant and an adjacent lower annular chamber containing a second gas generant. The sidewall of the inflator housing defines a plurality of gas exhaust openings from the upper and lower annular chambers. The inflator also includes igniter device which includes a dual output squib, an upper igniter chamber containing a first igniter charge, and a lower igniter chamber containing a second igniter charge. Upon activation, the dual output squib, selectively ignites at least one of the first and second igniter charges, with the dual output squib having:

a) a first discharge output whereby the first igniter charge is ignited to produce combustion products which in turn pass to the first chamber to ignite the first gas generant material to produce inflation gas at a first output level and b) a second discharge output whereby the second igniter charge is ignited to produce combustion products which in turn pass to the second chamber to ignite the second gas generant material to produce inflation gas at a second output level.

The invention still further comprehends an inflatable restraint system which includes specified inflator assembly, filter, inflatable airbag cushion and cushion retainer constructions. Specifically, the inflator assembly includes a generally circular cylindrical housing. The housing has a top wall, a bottom wall, a generally cylindrical sidewall defining a plurality of gas exhaust openings, and a peripheral bracket extending radially outwardly from the cylindrical sidewall below the plurality of gas exhaust openings. The housing defines a first chamber containing a first gas generant material and a second chamber containing a second gas generant material.

The inflator assembly also includes a single component igniter device which includes a dual output squib and has first and second igniter chambers containing respective first and second igniter charges. Upon activation, the dual output squib selectively ignites at least one of the first and second igniter charges, with the dual output squib having:

a) a first stage discharge whereby the first igniter charge is ignited to produce combustion products which in turn pass to the first chamber to ignite the first gas generant material to produce inflation gas at a first output level and b) a second stage discharge whereby the second igniter charge is ignited to produce combustion products which in turn pass to the second chamber to ignite the second gas generant material to produce inflation gas at a second output level.

The filter construction is in the form of a filter material surrounding the housing sidewall to cover at least the plurality of gas exhaust openings. The inflatable airbag cushion has an open mouth to receive inflation gas from the inflator. The airbag cushion is sized to receive the housing sidewall and the filter material, with a marginal edge of the airbag cushion secured adjacent the bracket. The annular airbag cushion retainer forms an inner boundary and a body. The inner boundary of the retainer is sized to receive the housing sidewall and the body of the retainer is sized to receive the filter material.

The invention also provides a method of operating a plural stage inflator. More specifically, the plural stage inflator includes a housing which defines a first chamber which contains a first gas generant material and a second chamber which contains a second gas generant material. The inflator also includes an igniter device which includes a dual output squib and has first and second igniter chambers containing respective first and second igniter charges. Upon actuation, the dual output squib, selectively ignites at least one of the first and second igniter charges. The dual output squib has:

a) a first stage discharge whereby the first igniter charge is ignited to produce combustion products which in turn pass to the first chamber to ignite the first gas generant material to produce inflation gas at a first output level and b) a second stage discharge whereby the second igniter charge is ignited to produce combustion products which in turn pass to the second chamber to ignite the second gas generant material to produce inflation gas at a second output level. In accordance with the invention, the method includes the step of actuating at least one of the first and second igniter charges of the dual output squib.

References to detection or sensing of "occupant presence" are to be understood to refer to and include detection and sensing of size, weight, and/or positions of the particular occupant under consideration.

References to inflator or inflation gas "output" are to be understood to refer to inflator performance output parameters such as the quantity, supply, and rate of supply of inflation gas. With "adaptive output inflators," the inflator output is generally dependent on selected operating conditions such as ambient temperature, occupant presence, seat belt usage and rate of deceleration of the motor vehicle, for example.

Other objects and advantages will be apparent to those skilled in the art from the following detailed description taken in conjunction with the appended claims and drawings.

DETAILED DESCRIPTION OF THE INVENTION

Figure 1:
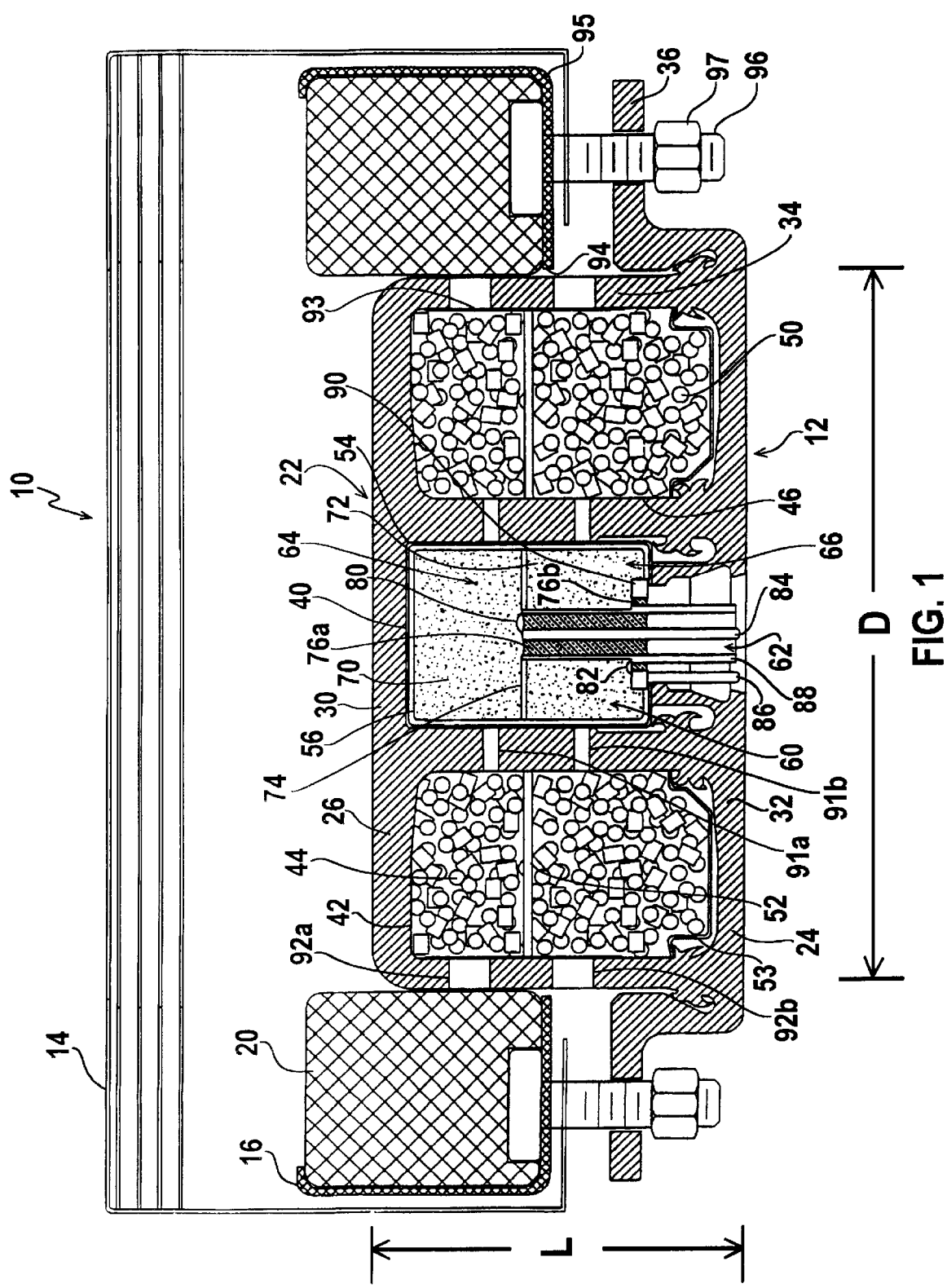
FIG. 1 is a partially exploded, partial sectional schematic side view of an inflatable restraint system having a plural stage inflator in accordance with one embodiment of the invention.

Referring initially to FIG. 1, there is illustrated an inflatable restraint system, generally designated by the reference numeral 10. While the invention will be described hereinafter with particular reference to a driver side airbag inflatable restraint system installation, it will be understood that the invention has general applicability to other types of kinds of airbag assemblies including, for example, passenger side, and side impact airbag assemblies such as for automotive vehicles including vans, pick-up trucks, and particularly automobiles.

The restraint system 10 includes a plural stage driver side inflator assembly 12 in accordance with a one embodiment of the invention. The restraint system 10 also includes an inflatable airbag cushion 14 secured to the inflator assembly 12 such as by means of an annular airbag cushion retainer 16.

The cushion retainer 16 also serves to secure a filter 20 in the system 10. The filter 20 can be of various forms as will be appreciated by those skilled in the art. For example, the filter 20 can take the form of a single block of reticulated metal wire.

The inflator assembly 12 includes a housing 22 such as formed from two aluminum pieces, i.e., a base 24 and a cap 26, welded together. The housing 22 is illustrated in the general form of a flattened, disk-shaped circular cylinder typically or generally having a length (denominated "L") to diameter (denominated "D") ratio of about 0.5 or less. It will be appreciated that such a sized and shaped housing may most conveniently correspond to the shape of the vehicle steering wheel and can therefore facilitate assembly in an aesthetically pleasing manner.

The inflator housing 22 includes a top wall 30, a bottom wall 32, a cylindrical sidewall 34, and a peripheral bracket 36 that extends radially outward from the housing 22. The housing 22 is configured to define a central, generally cylindrical chamber 40, a first or upper annular chamber 42 containing a first gas generant 44 and an adjacent second or lower annular chamber 46 containing a second gas generant 50.

The invention in its broader application is not limited to the use of particular or specific gas generants. As those skilled in the art will appreciate, the invention can be practiced using a wide variety of gas generant materials which meet flame temperature, stability, filterability, toxicity, corrosivity, and gas generation requirements. Examples include, without limitation, mixtures of combustible fuels composed of nitrate salts of amines or urea, such as cobalt hexamine trinitrate, and oxidants composed of metal oxide compounds. Examples of suitable nitrate salts of amines or urea include, without limitation, ethylenediamine dinitrate, guanidine nitrate, urea nitrate, and semicarbazide nitrate, and combinations thereof, or the like. Examples of suitable metal oxidizers for combustion include, without limitation, copper (II) oxide, copper (II) trihydroxy nitrate, and strontium nitrate, or mixtures, and the like.

Examples of specific suitable mixtures include about 48 wt. percent basic copper (II) nitrate and about 42 wt. percent guanidine nitrate or about 59 wt. percent basic copper (II) nitrate, about 41 wt. percent guanidine nitrate, and about 5 wt. percent guar gum. The inclusion of a binder, such as a soluble polysaccharide, for example guar gum, may be desired to improve formability. Reference can be made to Barnes et al., U.S. Pat. No. 5,608,183, drawn to gas generants containing amine nitrates plus basic copper (II) nitrate and/or cobalt (III) triammine trinitrate, for a further description of other compositions.

It is also to be appreciated that while different gas generant materials can, if desired, be utilized in each of the first and second gas generant storage chambers, the invention, in its broader application is not so limited. Thus, the same gas generant composition or formulation can, if desired, be utilized in the first and second gas generant containing chambers, such as may be desired to further simplify manufacture and design.

The upper and lower annular chambers, 42 and 46, respectively, are separated from each other by means of a generally annular generant separator plate 52. A generant retainer 53 at the base side of chamber 46 is a construction expedient, retaining the gas generants within the chambers 42 and 46, respectively, until the housing cap 26 is joined with the housing base 24.

The central chamber 40 houses a sealing cup 54 which surrounds a containment cup 56. The containment cup 56 contains, as a single component, an igniter device 60 comprising a dual output squib 62 and first and second igniter chambers, 64 and 66, respectively, containing respective first and second charges, 70 and 72, respectively, of an appropriate igniter material such as $BKNO_3$, such as is known in the art. The first and second igniter chambers, 64 and 66, respectively, and the respective first and second charges, 70 and 72, are separated from each other by means of an igniter separator plate 74.

The squib 62 includes at least first and second, i.e., central and exterior, quantities of glass or other insulating material, 76a and 76b, respectively, first and second bridgewires 80 and 82 or other suitable ignition means, and at least three electrical connections, a central pin connection 84, an outer pin connection 86 and an intermediate tube connection 88. The first bridgewire 80 is embedded in the first igniter charge 70 and the second bridgewire 82 is embedded in the second igniter charge 72.

With the squib 62, when a sensor (not shown) indicates the need for the initiation of the first igniter charge 70, a current is passed to the center pin connection 84. Current then travels through the center pin connection 84 to the first bridgewire 80 and completes its travel through the intermediate tube connection 88 to a connector (not shown).

The center pin 84 is insulated from the intermediate tube connection 88 by the central insulator 76a. In practice, such a central insulator is typically fabricated of glass to effect a hermetic seal.

With passage of current through the first bridgewire 80, the bridgewire 80 is heated to the ignition temperature of the first igniter charge 70, with ignition then progressing through the charge 70. The sympathetic ignition of the second igniter charge 72 is avoided as a result of the inclusion of the igniter separator plate 74.

Similarly, when a sensor indicates the need for the initiation of the second igniter charge 72, a current is passed to the outside pin connection 86. Current then travels through the outside pin connection 86 and to an exterior header 90 to the second bridgewire 82. The current then completes its travel through the intermediate tube connection 88 to a connector (not shown).

The exterior header 90 is insulated from the intermediate tube connection 88 by the exterior insulator 76b. As with the central insulator 76a, in practice the exterior insulator 76b is commonly fabricated of glass to effect a hermetic seal.

With passage of current through the second bridgewire 82, the bridgewire 82 is heated to the ignition temperature of the second igniter charge 72, with ignition then progressing through the charge 72. As with the above described initiation of the first igniter charge 70, desired isolation of the ignition is affected by the igniter separator plate 74.

In normal operation, the containment cup 56 desirably maintains its structural integrity and the sealing cup 54 maintains a hermetic seal about the igniter device 60 and electrically isolates the igniter device 60 from outside contact.

Radial passageways 91a and 91b, respectively, join the central chamber 40 with the first and second chambers 42 and 46, respectively. The housing sidewall 34 defines a plurality of first and second gas exhaust openings 92a and 92b, respectively, which allow generated gas to exit from the first and second chambers of the housing, 42 and 46, respectively, between the bracket 36 and the top wall 30.

Surrounding the first and second gas generants 44 and 50, respectively, is an adhesive-backed foil seal 93 which hermetically seals the first and second gas generants 44 and 50 within the inflator 12, protecting the gas generants from ambient conditions, such as moisture. When the first gas generant 44 is ignited, gases are generated which rupture the foil seal 93 and pass through the first gas exhaust openings 92a. Similarly, when the second gas generant 50 is ignited, gases are generated which rupture the foil seal 93 and pass through the second gas exhaust openings 92b.

As shown in FIG. 1, the airbag cushion 14 is desirably sized to receive the inflator housing 22 and the filter material 20. As identified above, the filter 20 is secured against the housing sidewall 34 by the retainer 16. The filter 20 serves to cover the exhaust openings 92a and 92b such that the effluent passing out of the housing 22 from either or both the exhaust openings 92a and 92b are passed through the filter 20. The filter can thus serve to permit and allow cooling of the gas generant ignition products which are passed therethrough as well as to provide filtration of particulate matter therefrom.

The retainer 16 includes an inner boundary 94 and a body 95 and can be manufactured from a single sheet of metal and stamped or forged into the illustrated one-piece shape. The retainer inner boundary 94 is sized to receive the housing sidewall 34 and the retainer body 95 is sized to receive the filter 20. It will be appreciated that such a retainer 16, in addition to serving to retain the airbag cushion 14 joined to the housing 22, may also assist in directing the effluent through the filter 20 into the associated airbag cushion 14. Thus, as will be appreciated, the gaseous material passing through the filter 20 is directed to and in the associated airbag cushion 14 to result in the inflation thereof.

Coupling means secure the airbag cushion 14, the retainer ring 16, the filter 20 and the inflator assembly 12 together. As shown in FIG. 1, the coupling means may comprise a plurality of bolts 96, which extend through appropriately formed openings in the airbag cushion 14, the retainer ring 16 and the housing peripheral bracket 36, and secured with nuts 97 to retain the marginal edge of the airbag cushion 16 between the retainer ring 16 and the bracket 36 in a gas tight manner. The coupling means may alternatively comprise welds, rivets, crimping or other suitable means.

It will be appreciated that such a plural stage inflator assembly can provide operation performance in accordance with selected operating conditions as may be required or desired for particular inflatable restraint system installations and applications. For example, such an inflator assembly can be operated to have a first stage discharge whereby the first igniter charge 70 is ignited to produce combustion products which are passed to the first gas generant chamber 42 to ignite the first gas generant material 44 to produce inflation gas at a first output level. Alternatively, such an inflator assembly can be operated to have a second stage discharge whereby the second igniter charge 72 is ignited to produce combustion products which are passed to the second gas generant chamber 46 to ignite the second gas generant material 50 to produce inflation gas at a second output level.

With such an inflator assembly of the invention, it will be appreciated that each of the first and second igniter charges and, in turn, the first and second gas generant materials can be actuated and fired independently as well as in isolation (i.e., without the actuation or firing of the other), if desired.

In addition, it will be appreciated that the inflator assembly of the invention can, if desired, be operated in a manner wherein both the first and second igniter charges are ignited with both the first and second gas generant materials, in turn, being ignited to produce inflation gas. Such operation and ignition of both the first and second igniter charges and first and second gas generant materials can involve the simultaneous or near simultaneous actuation and firing of the first and second igniter charges or the sequential actuation and firing of the first and second igniter charges, as may be desired. Further, such sequential actuation and firing may involve the actuation and firing of either first or second igniter charge and, in turn, the first or second gas generant materials, prior to the actuation and firing of the other. Still further, with such sequential actuation and firing, the time lag or delay between actuation and firing of the stages can be tailored to meet the specific requirements for a particular inflatable restraint system installation, as will be appreciated by those skilled in the art. Thus, such inflator assemblies are particularly suited for application as adaptive output inflators can be made generally dependent on one or more selected operating conditions such as ambient temperature, occupant presence, seat belt usage and rate of deceleration of the motor vehicle, for example.

Further, it will be appreciated that in the above-described inflatable restraint system, a single filter or filter element 20 can be used for the filtration of the inflation products of the inflation discharge of both the first and second stages, thus simplifying system design.

Also, with the utilization of a single filter element rather than individual and discrete filter elements for the output of each inflation stage, better utilization of the space within the system can be realized. Thus, facilitating the design of a plural stage inflation system to be generally housed within the envelope typically or usually sized and provided for system installations, particularly for driver side inflatable restraint systems, such as sized to be housed within or at a steering wheel column or hub.

Further, the above-described inflator assembly utilizes a single squib such as placed in the center portion of the inflator, facilitating accommodation of wire harness designs such as are currently commonly utilized in vehicle designs, thus facilitating the manufacture and installation of such inflators and correspondingly designed inflatable restraint systems.

Figure 2:
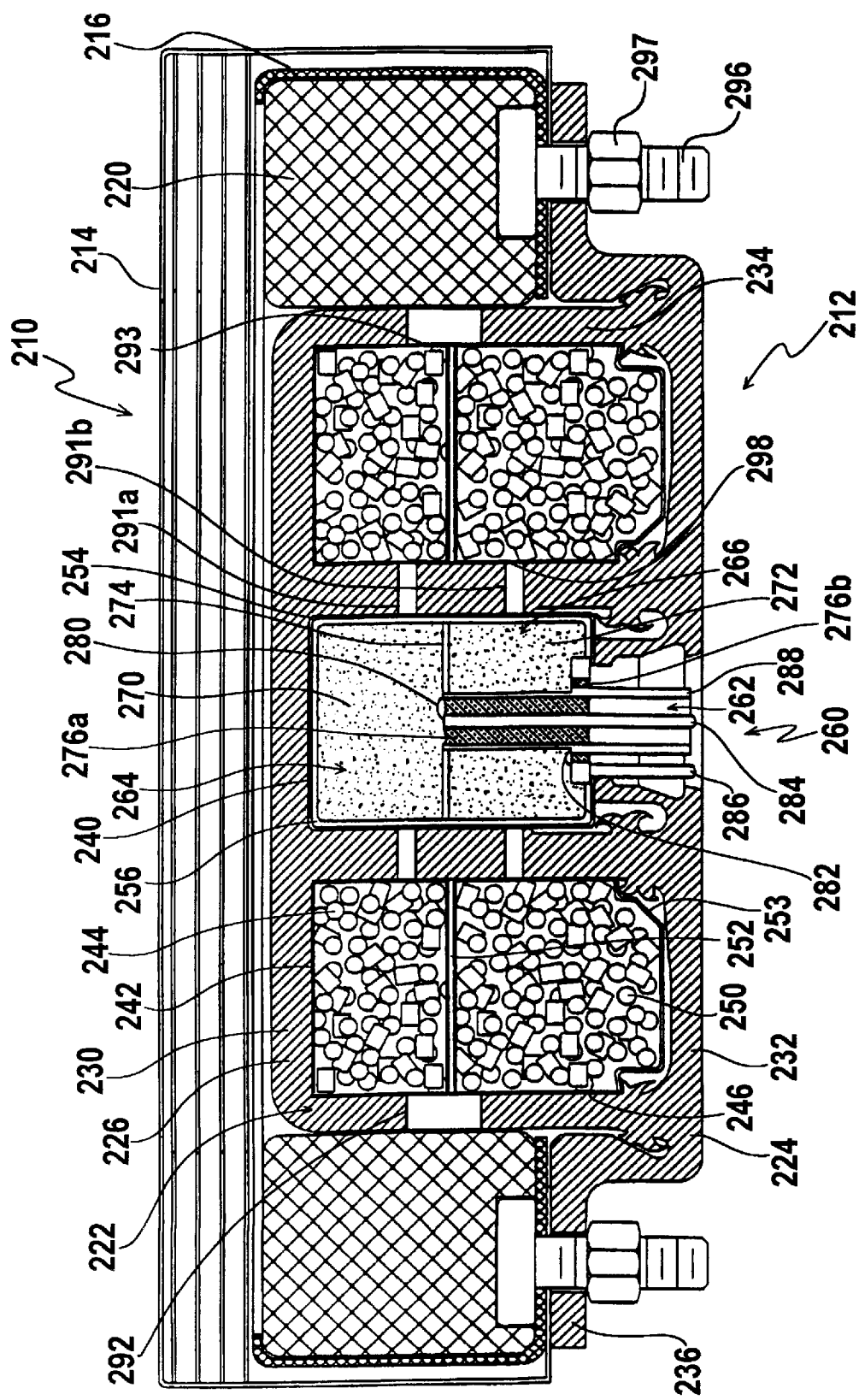
FIG. 2 is a simplified, partial sectional schematic side view of an inflatable restraint system having a plural stage inflator in accordance with an alternative embodiment of the invention.

FIG. 2 illustrates an inflatable restraint system, generally designated by the reference numeral 210, having a plural stage inflator 212 in accordance with an alternative embodiment of the invention.

The system 210 is generally similar to the system 10 described above with reference to FIG. 1 and, in addition to the plural stage inflator 212, includes an airbag cushion 214, a retainer 216, a filter 220 and appropriate coupling means, such as bolts 296 and nuts 297.

In addition, the plural stage inflator assembly 212 is generally similar to the inflator assembly 12 described above and includes an inflator housing 222 such as formed from two aluminum pieces, i.e., a base 224 and a cap 226, welded together. The housing 222 includes a top wall 230, a bottom wall 232, a cylindrical sidewall 234, and a peripheral bracket 236 that extends radially outward from the housing 222. The housing 222 is configured to define a central, generally cylindrical chamber 240, a first or upper annular chamber 242 containing a first gas generant 244 and an adjacent second or lower annular chamber 246 containing a second gas generant 250. The upper and lower annular chambers, 242 and 246, respectively, are separated from each other by means of a generally annular generant separator plate 252.

As with the inflator assembly 12 described above, a generant retainer 253 is included at the base side of chamber 246 as a construction expedient to assist in retaining the gas generants within the chambers 242 and 246, respectively, until the housing cap 226 is joined with the housing base 224.

The central chamber 240 houses a sealing cup 254 which surrounds a containment cup 256. The containment cup 256 contains, as a single component, an igniter device 260, similar to that described above and comprising a dual output squib 262 and first and second igniter chambers, 264 and 266, respectively, containing respective first and second igniter charges, 270 and 272, respectively, separated from each other by means of an igniter separator plate 274.

The dual output squib 262 is similar to the above-described squib 62 and includes at least first and second, i.e., central and exterior, quantities of glass or other insulating material, 276a and 276b, respectively, first and second bridgewires 280 and 282 or other suitable ignition means, and at least three electrical connections, a central pin connection 284, an outer pin connection 286 and an intermediate tube connection 288. The first bridgewire 280 is embedded in the first igniter charge 270 and the second bridgewire 282 is embedded in the second igniter charge 272.

Radial passageways 291a and 291b, respectively, join the central chamber 240 with the first and second chambers 242 and 246, respectively. An adhesive-backed foil seal 298 seals the first and second chambers 242 and 246, respectively, from fluid contact with the central chamber 240.

The inflator assembly housing 222 differs from inflator housing 22 in the sidewall 234 inclusion of only a single series of gas exhaust openings 292 is used to allow discharge of generated gas from both the first and second gas generant chambers 242 and 246.

Surrounding the first and second gas generants 244 and 250, respectively, is an adhesive-backed foil seal 293 which hermetically seals the first and second gas generants 244 and 250 within the inflator 212, protecting the gas generants from ambient conditions, such as moisture. When the first gas generant 244 is ignited, gases are generated which rupture the foil seal 293 and pass through the gas exhaust openings 292. Similarly, when the second gas generant 250 is ignited, gases are generated which rupture the foil seal 293 and pass through the gas exhaust openings 292.

Thus, the invention provides a plural stage inflator of a simpler design than previously available. More particularly, the invention provides a plural stage inflator and associated inflatable restraint system, particularly an inflator for a driver side inflatable restraint system installation, wherein the inflator incorporates a single component, dual output squib and the system includes an inflator external inflation media filter material, particularly to the exclusion of an inflator internal filter.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A plural stage inflator for use in inflating an inflatable restraint airbag cushion, said inflator comprising:
   a housing defining a first chamber containing a first gas generant material and a second chamber containing a second gas generant material; and
   igniter device comprising a dual output squib with first and second igniter chambers containing respective first and second igniter charges the first and second igniter chambers being configured in a stacked arrangement within the housing, the first and second igniter chambers being configured in a side by side arrangement within the housing wherein the dual output squib, upon activation, selectively ignites at least one of the first and second igniter charges, with the dual output squib having:
   a) a first stage discharge whereby the first igniter charge is ignited to produce combustion products which in turn pass to the first chamber to ignite the first gas generant material to produce inflation gas at a first output level and
   b) a second stage discharge whereby the second igniter charge is ignited to produce combustion products which in turn pass to the second chamber to ignite the second gas generant material to produce inflation gas at a second output level.

2. The inflator of claim 1 shaped and sized for driver side placement within a vehicle at the vehicle steering wheel.

3. The inflator of claim 1 wherein said housing also defines a central chamber wherein said igniter device is housed.

4. The inflator of claim 3 wherein at least one of said first and second chambers is in the form of annular-shaped chamber about said central chamber.

5. The inflator of claim 4 wherein each of said first and second chambers are in the form of annular-shaped chambers about said central chamber.

6. The inflator of claim 1 wherein said housing is a generally circular cylinder comprising a top wall, a bottom wall, and a generally cylindrical sidewall.

7. The inflator of claim 6 wherein the generally cylindrical sidewall includes a plurality of inflation gas exhaust openings from the first and second chambers, respectively.

8. The inflator of claim 7 wherein at least one of the gas exhaust openings from the first chamber also serves as a gas exhaust opening from the second chamber.

9. An inflatable restraint system subassembly comprising:
   said plural stage inflator of claim 3 wherein said housing further comprises a peripheral bracket extending radially outwardly from the cylindrical sidewall below the gas exhaust openings.

10. An inflatable restraint system comprising the subassembly of claim 9 and additionally comprising:
    a filter material surrounding the housing sidewall to cover at least the plurality of gas exhaust openings;
    an inflatable airbag cushion having an open mouth for receiving generated gas, the open mouth sized to receive the housing sidewall and the filter material, with a marginal edge of said airbag cushion defining the open mouth received adjacent the bracket;
    an annular airbag cushion retainer including at least an inner boundary and a body, with the inner boundary sized to receive the housing sidewall and the body sized to receive said filter material.

11. The inflator of claim 1 wherein gas generant materials of the same composition are contained in said first and second chambers.

12. The inflator of claim 1 wherein the first gas generant material contained in said first chamber differs in composition from the second gas generant material contained in said second chamber.

13. An inflatable restraint system comprising:
    an inflator assembly including a generally circular cylindrical housing, the housing having a top wall, a bottom wall, a generally cylindrical sidewall including a plurality of gas exhaust openings, and a peripheral bracket extending radially outwardly from the cylindrical sidewall below the plurality of gas exhaust openings, the housing defining a first chamber containing a first gas generant material and a second chamber containing a second gas generant material, said inflator assembly also including a single component igniter device comprising a dual output squib with first and second igniter chambers containing respective first and second igniter charges, the first and second igniter chambers being configured in a side by side arrangement within the housing wherein the dual output squib, upon activation, selectively ignites at least one of the first and second igniter charges the first and second igniter chambers being configured in a stacked arrangement within the housing, with the dual output squib having:
    a) a first stage discharge whereby the first igniter charge is ignited to produce combustion products which in turn pass to the first chamber to ignite the first gas generant material to produce inflation gas at a first output level and
    b) a second stage discharge whereby the second igniter charge is ignited to produce combustion products which in turn pass to the second chamber to ignite the second gas generant material to produce inflation gas at a second output level;
    a filter material surrounding the housing sidewall to cover at least the plurality of gas exhaust openings;
    an inflatable airbag cushion having an open mouth for receiving generated gas, the open mouth sized to receive the housing sidewall and the filter material, with a marginal edge of said airbag cushion defining the open mouth received adjacent the bracket;

an annular airbag cushion retainer having an inner boundary, a body and an outer boundary, with the inner boundary sized to receive the housing sidewall and the body sized to receive said filter material.

14. The inflatable restraint system of claim 13 wherein said inflator assembly housing also defines a central chamber wherein said igniter device is housed.

15. The inflatable restraint system of claim 14 wherein at least one of said first and second chambers is in the form of annular-shaped chamber about said central chamber.

16. The inflatable restraint system of claim 15 wherein each of said first and second chambers are in the form of annular-shaped chambers about said central chamber.

17. A method of operating a plural stage inflator which includes:

a housing defining a first chamber containing a first gas generant material and a second chamber containing a second gas generant material; and igniter device comprising a dual output squib with first and second igniter chambers containing respective first and second igniter charges the first and second igniter chambers being configured in a stacked arrangement within the housing, the first and second igniter chambers being configured in a side by side arrangement within the housing wherein the dual output squib, upon activation, selectively ignites at least one of the first and second igniter charges, with the dual output squib having:

a) a first stage discharge whereby the first igniter charge is ignited to produce combustion products which in turn pass to the first chamber to ignite the first gas generant material to produce inflation gas at a first output level and b) a second stage discharge whereby the second igniter charge is ignited to produce combustion products which in turn pass to the second chamber to ignite the second gas generant material to produce inflation gas at a second output level;

said method comprising the step of actuating at least one of the first and second igniter charges of the dual output squib.

18. The method of claim 17 wherein both the first and second igniter charges of the dual output squib are actuated.

19. The method of claim 18 wherein the first and second igniter charges are actuated substantially simultaneously.

20. The method of claim 18 wherein the second igniter charge is only actuated at a selected time interval subsequent to actuation of the first igniter charge.

* * * * *